(12) United States Patent
Andersen et al.

(10) Patent No.: US 11,506,481 B2
(45) Date of Patent: Nov. 22, 2022

(54) APPARATUS AND A METHOD FOR ROLLING WEIGHT DEFLECTION MEASUREMENT

(71) Applicant: Ramboll Sweden AB, Stockholm (SE)

(72) Inventors: Mathias Bækbo Andersen, Søborg (DK); Jack Larsen, Hedenhusene (DK); Søren Norup Rasmussen, Roskilde (DK)

(73) Assignee: Ramboll Sweden AB, Stockholm (SE)

( * ) Notice: Subject to any disclaimer, the term of this patent is extended or adjusted under 35 U.S.C. 154(b) by 362 days.

(21) Appl. No.: 16/626,109

(22) PCT Filed: Jun. 22, 2017

(86) PCT No.: PCT/EP2017/065437
§ 371 (c)(1),
(2) Date: Dec. 23, 2019

(87) PCT Pub. No.: WO2018/233838
PCT Pub. Date: Dec. 27, 2018

(65) Prior Publication Data
US 2020/0217646 A1 Jul. 9, 2020

(51) Int. Cl.
| | |
|---|---|
| *G01B 11/16* | (2006.01) |
| *E01C 23/01* | (2006.01) |
| *E01C 23/07* | (2006.01) |
| *G01B 11/25* | (2006.01) |

(Continued)

(52) U.S. Cl.
CPC ............ *G01B 11/16* (2013.01); *E01C 23/01* (2013.01); *E01C 23/07* (2013.01); *G01B 11/2518* (2013.01); *G01C 7/04* (2013.01); *G01M 5/0091* (2013.01)

(58) Field of Classification Search
None
See application file for complete search history.

(56) References Cited

U.S. PATENT DOCUMENTS

| 4,571,695 | A | * | 2/1986 | Elton | ............... G01M 5/0058 |
|---|---|---|---|---|---|
| | | | | | 702/167 |
| 2011/0259114 | A1 | | 10/2011 | Ullidtz | |

(Continued)

FOREIGN PATENT DOCUMENTS

| CN | 202 559 215 | | 11/2012 |
|---|---|---|---|
| CN | 103 452 032 | A | 12/2013 |
| WO | WO 2013/185759 | A1 | 12/2013 |

*Primary Examiner* — Eileen M Adams
(74) *Attorney, Agent, or Firm* — Holland & Hart LLP

(57) ABSTRACT

An apparatus and a method for rolling weight deflection measurement comprising a rolling wheel to be moved along a measuring surface in a first direction. The apparatus comprises a number of spaced apart range sensors arranged on at least one carrier and configured to measure a distance to said measuring surface at pavement locations passed by the apparatus. A first of said range sensors is arranged at a predetermined location with respect to said rolling wheel, and the remainder of the range sensors are arranged in spaced apart manner in line with said first range sensor in the in first direction. At least one inclination sensor is configured to measure at least a change in inclination of said at least one carrier, a curvature parameter value for said measuring surface is calculated using measurements from said range sensors and said inclination sensor.

6 Claims, 3 Drawing Sheets

(51) Int. Cl.
  *G01C 7/04* (2006.01)
  *G01M 5/00* (2006.01)

(56) References Cited

U.S. PATENT DOCUMENTS

2015/0240431 A1* 8/2015 Madsen .............. G01M 5/0091
  73/146
2015/0293216 A1* 10/2015 O'Dea .................. B60W 30/12
  701/23
2018/0038218 A1* 2/2018 Hay ......................... G01V 3/26

* cited by examiner

APPARATUS AND A METHOD FOR ROLLING WEIGHT DEFLECTION MEASUREMENT

CROSS-REFERENCE

The present application is a national stage entry under 35 U.S.C. § 371 of International Patent Application No. PCT/EP2017/065437, filed 22 Jun. 2017, and entitled "AN APPARATUS AND A METHOD FOR ROLLING WEIGHT DEFLECTION MEASUREMENT."

FIELD OF DISCLOSURE

The present disclosure relates to rolling weight deflection measurements, and in particular an apparatus for rolling weight deflection measurement.

BACKGROUND

Rolling weight deflectometers and their use are well established in surveying of pavements, such as road or airport runways covered with concrete or tarmac, for faults and defects. A rolling weight deflectometer comprises a heavy weight, e.g. 5,000 kg or more, supported by a wheel, which is rolled over the pavement at relatively high speed such as 100 km/h. The weight causes a localised depression basin in the pavement surface around the wheel. Because of the elastic properties of the pavement, the deflection basin moves along the pavement surface together with the rolling weight, leaving no permanent depression in the surface. The depth of the depression basin has been used as an indicator for the elasticity module of the pavement, in turn, indicating defects and faults in the pavement, in particular the deeper layers, which need further investigation. Due to the high speed, the use of a rolling weight deflectometer is an efficient way of surveying the pavement.

However, as explained in e.g. U.S. Pat. No. 5,753,808, WO2013/185759 or the article 'Rolling Weight Deflectometer with Thermal and Vibration Bending Compensation' Johnson, R. F. et al, TRANSPORTATION RESEARCH RECORD 1540, 1996, the deflection caused in the pavement is rather minute, e.g. in the magnitude of 100 micrometers, compared to the general surface roughness of the pavement, and it is thus not an easy task to measure at 100 km/h. As explained in U.S. Pat. No. 5,753,808 and WO2013/185759, the traditional rolling weight deflectometer uses a number of distance sensors, e.g. four, arranged with equidistant spacing along a horizontal beam and measuring the distance downwardly to the pavement. One of the distance sensors is arranged above the point where the loaded wheel engages and deflects the pavement surface, whereas the others are arranged with equidistant spacing along the beam in front of the loaded wheel, i.e. leading as seen in the direction of motion when, during measurement, the rolling weight deflectometer is moved along the pavement. When comparing measuring data from all sensors in two subsequent situations, namely when the loaded wheel has moved exactly one sensor-spacing distance, that is from a first position to a second position corresponding exactly to the position where the preceding range sensor was when the loaded wheel was in the first position, the actual deflection caused can be calculated quite precisely, using a suitable algorithm, e.g., the Harr algorithm as explained in U.S. Pat. No. 5,753,808 and WO2013/185759.

For calculating the deflection using the Harr algorithm, however, the assumption is made that the spacing between the range sensors is so long that all three leading sensors are outside the deflection basin, allowing the geometry of the undeflected pavement surface to be determined.

However, with equidistant spacing of the range sensors and a spacing between them sufficient for the assumption of the three leading sensors to be outside of the basin to hold true for practical purposes, the rolling weight deflectometer must have a substantial length. In practice, the spacing in prior art rolling weight deflectometers is about 3 meters, and the overall length of the rolling weight deflectometer including wheels and tow bar normally exceeds 10 meters. The prior art rolling weight deflectometers are therefore long and quite unhandy, considering that a towed rolling weight deflectometer, will have to be manoeuvred like any other trailer, including turning and reversing, when not running in a straight line during surveying.

SUMMARY

Based on this prior art it is the object of the present disclosure to provide a rolling weight deflectometer which does not suffer from the above drawbacks.

According to a first aspect of the present disclosure this object is achieved by an apparatus for rolling weight deflection measurement comprising a rolling wheel to be moved along a measuring surface in a first direction, a frame extending essentially along said measuring surface in said first direction, at least one carrier, and a number of spaced apart range sensors arranged on said at least one carrier and configured to measure a distance to said measuring surface, a first of said range sensors being arranged at a predetermined location with respect to said rolling wheel, and the remainder of the range sensors being arranged in spaced apart manner in line with said first range sensor in the first direction, characterized in further by comprising at least one inclination sensor configured to measure at least a change in inclination of said at least one carrier.

By incorporating the inclination sensor it becomes possible to calculate a curvature parameter value of the depression basin, which is an improvement compared to the quantity that is calculated using the traditional Harr algorithm mentioned above. This, in turn, allows more knowledge to be gained about the layers below the surface. Furthermore, combined with the realization that absolute deflections are not a requirement for interpretation and modelling of the pavement condition, it allows that the rolling weight deflectometer can be made shorter than the prior art rolling weight deflectometers.

Thus, according to the second aspect of the disclosure, the object is achieved by a method for surveying a pavement using the rolling weight deflectometer, wherein, using said number of range sensors, a corresponding number of sequential distance measurements are made over time as the rolling weight deflectometer is moved along said measuring surface, using said inclination sensor a sequence of inclination measurements are made over time as the rolling weight deflectometer is moved along said measuring surface, comparing distance measurements for said passed locations, and calculating based on said distance measurements and corresponding inclination measurements a curvature parameter of the depression basin.

According to a first preferred embodiment of the first aspect of the disclosure, a first of said range sensors is arranged at a location corresponding to said rolling wheel, and the remainder of the range sensors being arranged in spaced apart manner preceding said first range sensor in the first direction.

This is the traditional way of arranging the sensors, and it would therefore make it easy to implement the present disclosure in existing rolling weight deflectometer constructions or even retrofit rolling weight deflectometers with the present disclosure.

According to a preferred embodiment of the first aspect of the disclosure, said inclination sensor comprises at least a pair of accelerometers. Due to their widespread use in e.g. smart phones accelerometers are readily available and incur only low costs as compared to e.g. a gyroscope.

According to a further preferred embodiment, the range sensors and the inclination sensor provide input to a data processing means adapted to calculate a curvature parameter value of a depression basin formed by the apparatus in the measuring surface when the apparatus is moved along the measuring surface, Calculating a curvature parameter yields the possibility of better estimating the condition of the pavement, in particular the hidden lower layers.

According to another preferred embodiment, the number of range sensors is three. Using an inclination sensor, no more than three range sensors is needed. This in turn allows the overall length of the rolling weight deflectometer to be reduced as compared to the prior art rolling weight deflectometers, using four range sensors.

According to a preferred embodiment according to the second aspect of the disclosure the curvature parameter is the value κ calculated using the formula: $\kappa_i = +d_{i+2}$ where $d_i$ is the deflection measured with the i'th range sensor, $d_{i+1}$ is the deflection measured with the (i+1)'th range sensor, and $d_{i+2}$ is the deflection measured with the (i+2)'th range sensor. This has the advantage that it yields information based on only three range sensors. Accordingly, this reduces the necessary length of the rolling weight deflectometer, because only two range sensors need to be located outside of the deflection basin.

BRIEF DESCRIPTION OF DRAWINGS

The principles of the present disclosure will now be described in greater detail based on non-limiting exemplary embodiments and with reference to the drawings, of which.

DETAILED DESCRIPTION

Figure 1:
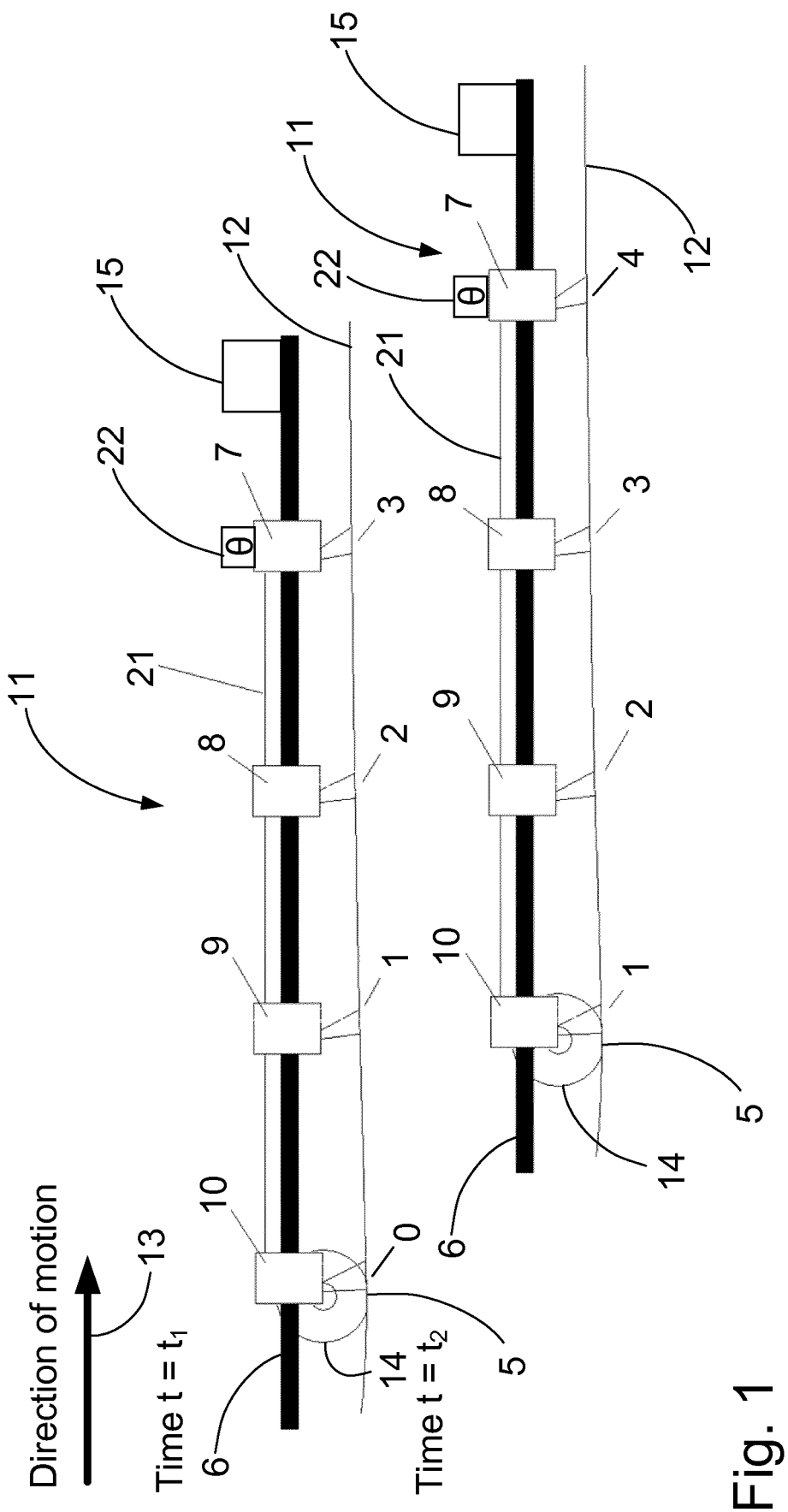
FIG. 1 schematically shows a rolling weight deflectometer according to the disclosure, FIG. 2 schematically shows the deflection of a pavement and the measurements performed, and FIG. 3 schematically shows the deflection of a pavement and the measurements performed using a shortened rolling weight deflectometer according to the disclosure.

Turning first to FIG. 1, the upper part schematically shows a rolling weight deflectometer 11 according to the present disclosure in a first position. The rolling weight deflectometer 11 is adapted to be moved, typically towed, in a first direction generally indicated with the arrow 13 along a test or measuring surface 12 formed by the pavement to be surveyed. The pavement could e.g. be a road or an airport runway covered with concrete or asphalt, which has to be surveyed for faults and defects. As the name suggests, the rolling weight deflectometer comprises a weight. The weight acts on a load wheel 14. For that reason, the rolling weight deflectometer is sometimes referred to as rolling wheel deflectometer. In either case, the abbreviation RWD is widely used. The load wheel 14 support is generally arranged at the trailing end of the rolling weight deflectometer 11 as defined by the motion in the first direction 13, The load wheel 14 is weighed down by a substantial mass so as to provide a down force on the pavement of e.g. 50 kN, 100 kN or 200 kN. This down force creates a deflection basin 5 around the load wheel 14 which propagates along the surface as the load wheel 14 moves. For illustration purposes, the depth of the deflection in the deflection basin 5 around the load wheel has been exaggerated, both in the upper and lower part of in FIG. 1, but in particular in FIG. 2. The actual deflection is in fact only in the micrometer range, typically in the range from 100 micrometers to 2000 micrometers, whereas the typical overall length of the rolling weight deflectometer 11 in the first direction would be about a few meters as will be explained below.

Along the length of the rolling weight deflectometer 11 runs a carrier in the form of an essentially horizontal beam 6. The beam 6 may be a part of the overall frame of the rolling weight deflectometer 11. Preferably the beam 6 carries a number of range sensors 7, 8, 9, 10 directed towards the test surface, but the range sensors 7, 8, 9, 10 may also be supported otherwise. Since the intention is to perform measurements in the micrometer range a laser alignment system 21 is preferably used to keep track of variations in the position of individual range sensors 7, 8, 9, 10 due to flexibility of the beam 6, variations in thermal expansion along the length thereof etc., as e.g. described in U.S. Pat. No. 5,753,808 incorporated herein by reference. The range sensors 7, 8, 9, 10 are preferably equidistant, i.e. with the same spacing between any two neighbouring range sensors 7, 8, 9, 10. Different spacing may also be used. Important is that the spacing is known. As will be explained below the rolling weight deflectometer may be made shorter when, in accordance with the present disclosure, an inclination sensor 22 has been provided in a fixed relationship with the range sensors 7, 8, 9, 10, e.g. rigidly connected to the essentially horizontal beam 6 or the frame. In this respect it should be noted that the essentially horizontal beam 6 is to be understood as a beam which is essentially parallel to an arbitrary reference plane of the measuring surface. If the pavement to be surveyed goes up or downhill deviations from horizontal will be evident. Furthermore, the beam 6 is only essentially horizontal, as the very purpose of the inclination sensor 22 is to detect the very minute angular deviations of the beam 6 that inter alia stems from movements as the rolling weight deflectometer 11 moves over the measuring surface, i.e. the pavement being surveyed.

Preferably, a gyroscope is used as the inclination sensor 22. Gyroscopes come in many variations, such as classical spinning wheel gyroscopes, ring laser gyroscopes, fibre optic gyroscopes, and micro machined vibrating gyroscopes. The latter have become widely used in consumer electronics and now comes at reasonable prices. Alternatively, a pair of accelerometers could be used. Unlike the gyroscope which may be mounted at any suitable place in rigid connection with the range sensors 7, 8, 9, 10 on the rolling weight deflectometer 11, e.g. on the beam 6, the accelerometers should be placed at spaced apart locations e.g. at either end of the rolling wheel deflectometer 11, e.g. at either end of the beam 6.

The range sensors 7, 8, 9, 10 used in the present disclosure are preferably line scanners as disclosed in WO2013/185759, incorporated herein by reference. Currently preferred is a Gocator 2340 line scanner, available from LMI Technologies, Inc. Line scanners of this type project a line onto the surface at an angle using a laser fanning out from a point source.

The individual range sensors 7, 8, 9, 10 are preferably arranged to scan lines along the surface in a direction across the direction of movement. Repeating this scanning at suitable small intervals triggered e.g. by a tacho linked to the load wheel 14. Thus consecutive line scans will be made forming a virtual image of the surface with a given resolution depending inter alia on the resolution of the camera recording the undulations on the line and on the frequency with which the scan is triggered. The image is referred to as virtual because the resulting pixel values do not represent actual visual image data but distances. The distances need not be the vertical elevation of the sensor over the measuring area for the specific point but can, as seen from FIG. 2, be measured at an angle depending on the inclination of the beam 6, i.e. the minute angular deviation from essentially horizontal of the beam 6, as measured using the inclination sensor 22.

It should be noted that the above method of matching subsequent distance measurements with one and the same location as disclosed in WO2013/185759 is only one way of doing so, and that the use of an inclination sensor 22 according to the present disclosure is per se independent of the way the matching is done.

The rolling weight deflectometer 11 preferably further comprises a data processing means 15 such as a computer, which could, however, possibly also be located in a towing vehicle or at a remote location.

Figure 2:
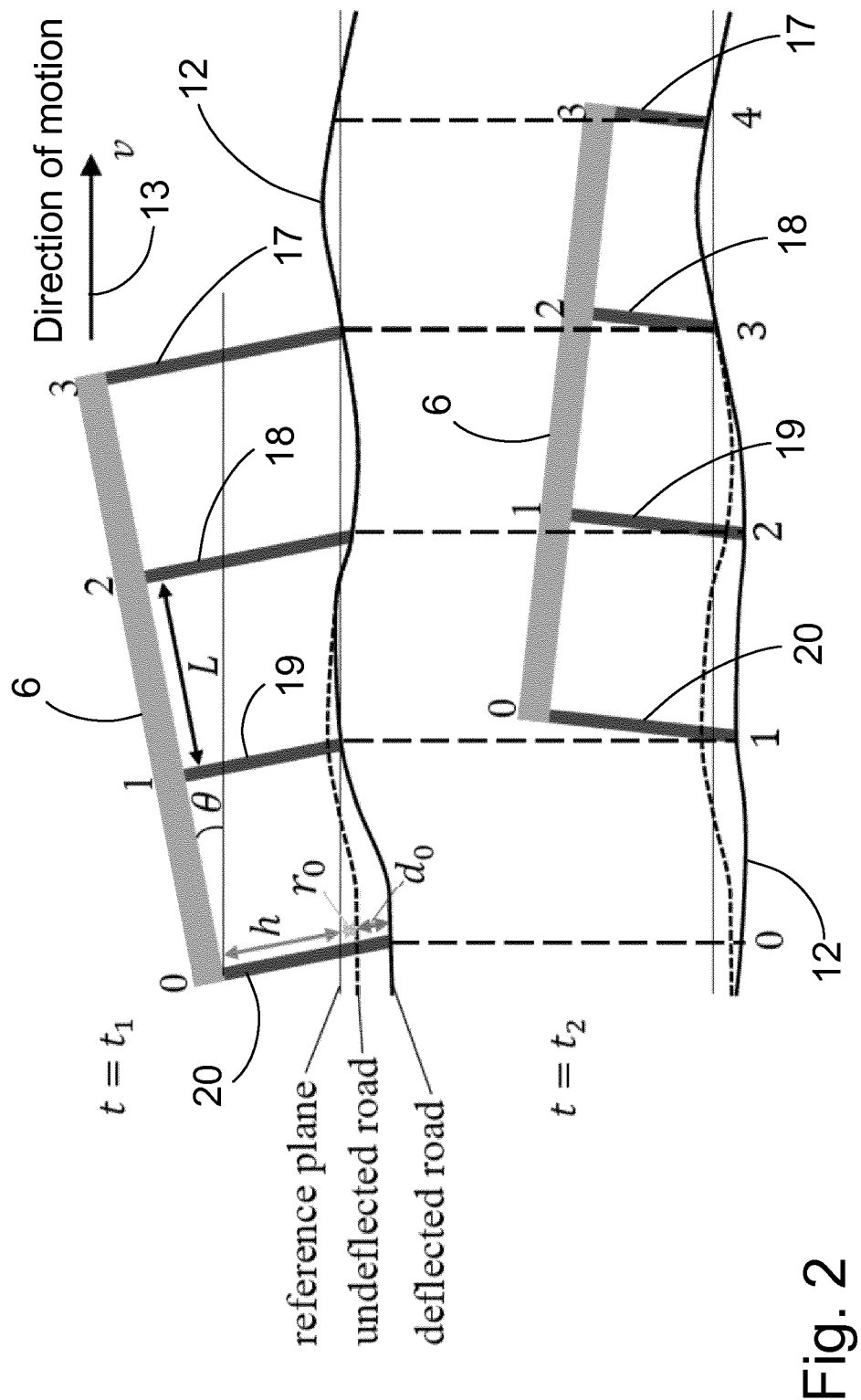

Turning now to FIG. 2, a schematic diagram of the measuring system is shown in conjunction with a deflected surveyed pavement with a measuring surface 12. Upper and lower parts of the diagram in FIG. 2 correspond to upper and lower parts of FIG. 1, only for illustration purposes are the deflection in and the unevenness of the measuring surface even more exaggerated.

Thus, in FIG. 2 the beam 6 is illustrated by the gray line. On the beam the four range sensors 7, 8, 9, 10 (not shown) are located at positions 0, 1, 2, and 3. As mentioned above, the range sensors 7, 8, 9, 10 are preferably laser range sensors, and for ease of explanation this will be assumed in the following. Accordingly, from the laser range sensors 7, 8, 9, 10 on the beam 6 four laser beams 17, 18, 19, 20 emanate in a direction towards the measuring surface 12, shown with a thick full line. For the purpose of explaining the algorithms involved in the measurement an arbitrary reference plane 23 is defined, and shown with a thin full line. Furthermore, using a thick dashed line the un-deflected measurement surface 24 is shown, i.e. the surface as it would have been, was the weight of the rolling weight deflectometer not deflecting it.

As can be seen, the laser beams 17, 18, 19 of the three of the four range sensors 7, 8, 9 at time $t_1$ (top) aim at the same location on the measurement surface as the laser beams 18, 19, 20 of range sensors 8, 9, 10 at time $t_2$ (bottom), allowing the comparison between deflected and un-deflected measurement surface.

The basic principle, also known as the Harr algorithm, as explained in U.S. Pat. No. 5,753,808 and WO2013/185759, assumes that at least four laser range sensors 7, 8, 9, 10 are attached equidistantly to the rigid beam. The laser range sensors record the distance $z_i$ from laser i to the ground simultaneously at times controlled by the user. The distance reading $z_i$ from laser i can be divided into four contributions:

(1) h, the distance from laser range sensor 10 at position O to the arbitrary reference plane 23.

(2) $a_i = i\, L \tan \theta$, the distance to a plane intersecting laser range sensor 10 at position O and which is parallel to the reference plane 23, L is the distance between two neighbouring laser range sensors 7, 8, 9, 10 on the beam 6 and $\theta$ is the angle between the beam 6 and the reference plane 23.

(3) $r_i$, the distance from the reference plane to the un-deflected road surface due to texture of the measuring surface 12, i.e. the unevenness of the measuring surface 12 itself.

(4) $d_i$, the distance from the un-deflected surface to the deflected surface due to deflection from the weight of the rolling weight deflectometer 11.

The objective is to measure each deflection $d_i$ independently, or at least some combination of deflections: as illustrated below, such combinations could be the so-called curvature or curvature-difference. In other words, the goal is to remove quantities from the observed data that do not relate to the deflections, such as the beam height h, the beam rotation $\theta$ and the surface texture $r_i$.

The equations relating the four laser range sensor measurements and their contributions at time $t_1$ are:

$$z_0 = h + 0L \tan \theta + r_0 + d_0$$

$$z_1 = h + 1L \tan \theta + r_1 + d_1$$

$$z_2 = h + 2L \tan \theta + r_2 + d_2$$

$$z_3 = h + 3L \tan \theta + r_3 + d_3$$

Using image correlation, a time $t_2$ is identified such that the measurements by lasers range sensors 10, 9, 8 at positions 0, 1 and 2 on the beam 6 hit the same place on the ground as the measurements by lasers 9, 8, 7 at positions 1, 2 and 3 on the beam 6 at time $t_1$, see FIG. 2. At time $t_2$, we denote the time-dependent variables $[z_i, h, \theta]$ with a prime and the equations are:

$$z_0' = h' + 0L \tan \theta' + r_1 + d_0$$

$$z_1' = h' + 1L \tan \theta' + r_2 + d_1$$

$$z_2' = h' + 2L \tan \theta' + r_3 + d_2$$

$$z_3' = h' + 3L \tan \theta' + r_4 + d_3 \qquad (2)$$

Note how the recording by laser i at time $t_1$ and $t_2$ involves the texture at location i and i+1, respectively. We have assumed that the shape of the deflection basin does not change between $t_1$ and $t_2$ such that:

$$d_i = d_i' \qquad (3)$$

The texture $r_i$ can be eliminated by subtracting the recording from laser i+1 at time $t_1$ from that of laser i at time $t_2$:

$$z_0' - z_1 = (d_0 - d_1) + (h' - h) + 0L(\tan \theta' - \tan \theta) + L \tan \theta$$

$$z_1' - z_2 = (d_1 - d_2) + (h' - h) + 1L(\tan \theta' - \tan \theta) + L \tan \theta$$

$$z_2' - z_3 = (d_2 - d_3) + (h' - h) + 2L(\tan \theta' - \tan \theta) + L \tan \theta \qquad (4)$$

If we define a new quantity called the deflection-difference $$\Delta d_i = d_i - d_{i+1} \qquad (5)$$

as well as the beam height-difference $\Delta h = h' - h$ then equation (4) can be written as:

$$d_0' = (z_0' - z_1) - \Delta h - 0L(\tan \theta' - \tan \theta) + L \tan \theta$$

$$d_1' = (z_1' - z_2) - \Delta h - 1L(\tan \theta' - \tan \theta) + L \tan \theta$$

$$d_2' = (z_2' - z_3) - \Delta h - 0L(\tan \theta' - \tan \theta) + L \tan \theta \qquad (6)$$

Equations (6) still contain both the beam height-difference $\Delta h$ and the beam angles $\theta$ and $\theta'$. Ali can be eliminated by subtracting (6)b from (6)a and (6)c from (6)b:

$$\Delta d_0 - \Delta d_1 = (z_0' - z_1) - (z_1' - z_2) + L(\tan \theta' - \tan \theta)$$

$$\Delta d_1 - \Delta d_2 = (z_1' - z_2) - (z_2' - z_3) + L(\tan \theta' - \tan \theta) \quad (7)$$

Inspired in part by numerical finite difference calculus, we introduce a new quantity called the curvature:

$$\kappa_i = \Delta d_i - \Delta d_{i+1} \quad (8)$$
$$= d_i - 2d_{i+1} + d_{i+2}$$

Then equation (7) simplifies to:

$$\kappa_0 = (z_0' - z_1) - (z_1' - z_2) + L(\tan \theta' - \tan \theta)$$

$$\kappa_1 = (z_1' - z_2) - (z_2' - z_3) + L(\tan \theta' - \tan \theta) \quad (9)$$

We assume that the angles are small, $\theta \ll 1$ and $\theta' \ll 1$, and remind that a Taylor Series expansion of the Tangent function around zero reveals that a linearization is a good approximation, $\tan x = x + O(x^3)$, and thus:

$$\kappa_0 \cong (z_0' - z_1) - (z_1' - z_2) + L\Delta\theta$$

$$\kappa_1 \cong (z_1' - z_2) - (z_2' - z_3) + L\Delta\theta \quad (10)$$

where $$\Delta\theta = \theta' - \theta \quad (11)$$

is the beam angle-difference between the two measurement times. The beam angle-difference can be measured very accurately using a gyroscope and the curvature can thereby be determined according to equation (10).

This is the new and inventive algorithm relating a curvature of a depression basin to the measurements from only three laser range sensors and a gyroscope. The new and inventive algorithm constitutes an improvement over the classical Harr algorithm, in which the so-called curvature-difference is determined, as demonstrated below. This furthermore allows the rolling weight deflectometer 11 to be made shorter than prior art rolling weight deflectometers.

To highlight the difference to the classical Harr algorithm, we now give a short description of it. In our terminology, the classical Harr algorithm measures a quantity called the curvature difference $$\Delta\kappa_i = \kappa_i - \kappa_{i+1} \quad (12)$$
$$= d_i - 3d_{i+1} + 3d_{i+2} - d_{i+3}$$

We then recover the classical Harr algorithm by subtracting (9)b from (9)a to eliminate the beam angle-difference $$\Delta\kappa_0 = [(z_0' - z_1) - (z_1' - z_2)] - [(z_1' - z_2) - (z_2' - z_3)] \quad (13)$$

or slightly rewritten:

$$\Delta\kappa_0 = (z_0' - 2z_1' + z_2') - (z_1 - 2z_2 + z_3) \quad (14)$$

This is the classical Harr algorithm relating the curvature-difference of a deflection basin to the measurements from four lasers.

Table 1 below shows a summary of the differences between the new inventive curvature K and the classical curvature-difference Δκ from the Harr algorithm.

TABLE 1

Summary of the differences between curvature and curvature-difference.

| Quantity | Symbol | Definition | Measured by |
|---|---|---|---|
| Curvature | $\kappa_i$ | $d_i - 2d_{i+1} + d_{i+2}$ | 3 lasers, 1 gyroscope |
| Curvature-difference | $\Delta\kappa_i$ | $d_i - 3d_{i+1} + 3d_{i+2} - d_{i+3}$ | 4 lasers |

We note that despite the fact that the measurement system can determine the curvature using only three laser range sensors, and the curvature-difference using only four laser range sensors it can be expanded with more equidistantly-spaced lasers than the three/four considered in the example above. For each new laser added, both a new curvature and curvature-difference can be formed. For instance, with a fifth laser, we can form three curvatures: $\kappa_0 = d_0 - 2d_1 + d_2$, $\kappa_1 = d_1 - 2d_2 + d_3$ and $\kappa_2 = d_2 - 2d_3 + d_4$, and two curvature-differences: $\Delta\kappa_0 = d_0 - 3d_1 + 3d_2 - d_3$ and $\Delta\kappa_1 = d_1 - 3d_2 + 3d_3 - d_4$.

So in pursuit of the object of the present disclosure it has been realized that by deviating from the classic Harr algorithm and not relying solely on distance measurements, it becomes possible to not only make a substantially shorter rolling weight deflectometer than those of the prior art, but also to gain additional knowledge about the pavement, in particular the sub-surface layers.

In particular, as can be understood from table 1, the inventors have realized that using an inclination sensor as in the above, it will be possible to reduce the length of the rolling wheel deflectometer 11 as one laser range sensor 7 can be omitted.

Figure 3:
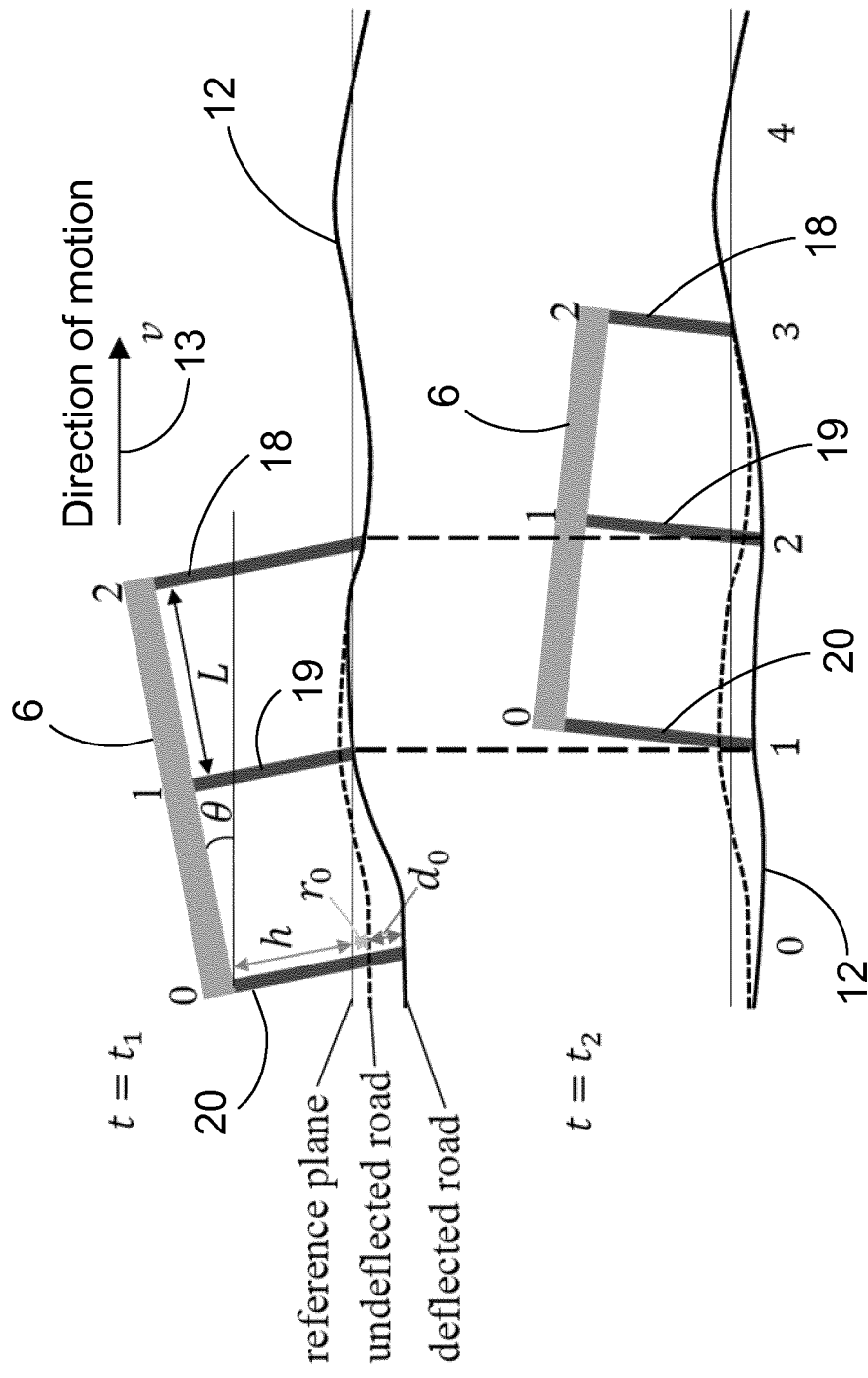

Thus, referring now to FIG. 3 with the new curvature algorithm only three range sensors, e.g. laser range sensors 10, 9, 8, and an inclination sensor 22, e.g. a gyroscope, are needed. Using only laser range sensors 10, 9, 8, the laser measurements and their contributions at time $t_1$ are:

$$z_0 = h + 0L \tan \theta + r_0 | + d_0$$

$$z_1 = h + 1L \tan \theta + r_1 | + d_1$$

$$z_2 = h + 2L \tan \theta + r_2 | + d_2 \quad (15)$$

and at time $t_2$:

$$z_0' = h' + 0L \tan \theta' + r_1 | + d_0$$

$$z_1' = h' + 1L \tan \theta' + r_2 | + d_1$$

$$z_2' = h' + 2L \tan \theta' + r_3 | + d_2 \quad (16)$$

Again, the texture $r_i$ can be eliminated by subtracting the recording from laser i+1 at time $t_1$ from that of laser i at time $t_2$:

$$z_0' - z_1 = (d_0 - d_1) + (h' - h) + 0L(\tan \theta' - \tan \theta) - L \tan \theta$$

$$z_1' - z_2 = (d_1 - d_2) + (h' - h) + 1L(\tan \theta' - \tan \theta) - L \tan \theta \quad (17)$$

Equations (17) can be rearranged as:

$$d_0 - d_1 = (z_0' - z_1) - (h' - h) - 0L(\tan \theta' - \tan \theta) + L \tan \theta$$

$$d_1 - d_2 = (z_1' - z_2) - (h' - h) - 1L(\tan \theta' - \tan \theta) + L \tan \theta \quad (18)$$

Equations (18) still contain both the beam heights and the beam angles. The beam heights can be eliminated by subtracting (18)b from (18)a:

$$d_0 - 2d_1 + d_2 = (z_0' - z_1) - (z_1' - z_2) + L(\tan \theta' - \tan \theta) \quad (19)$$

When, as indicated above, the curvature is defined as:

$$\kappa_i = d_i - 2d_{i+1} + d_{i+2} \quad (20)$$

then equation (19) is written as:

$$\kappa_0 = (z_0' - z_1) - (z_1' - z_2) + L(\tan\theta' - \tan\theta) \quad (21)$$

Assuming still that the angles are small, $\theta \ll 1$ and $\theta' \ll 1$, and reminding that a Taylor Series expansion of the Tangent function around zero reveals that a linearization is a good approximation, $\tan x = x + O(x^3)$, thus:

$$\kappa_0 \cong (z_0' - z_1) - (z_1' - z_2) + L\Delta\theta \quad (22)$$

where $$\Delta\theta = \theta' - \theta \quad (23)$$

is the beam angle-difference between the two measurement times. The beam angle-difference can be measured very accurately using a gyroscope and the curvature can thereby be determined according to equation (22).

This is the novel algorithm relating a curvature to the distance measurements from three range sensors and one inclination sensor. As is readily derivable form FIG. 3 this allows shortening the length of the rolling weight deflectometer 11 with an amount corresponding to the distance between the two laser range sensors, viz. the distance from the laser range sensor 8 in FIG. 1 to the now omitted laser range sensor 7.

Furthermore, by reducing the length of the rolling wheel deflectometer 11, it becomes easier to provide a beam 6 or carrier for the laser range sensors which is not prone to undesired flexing and deformation, in turn obviating the need for the laser alignment system 21. It may even be possible not to use a beam 6 as a carrier as such, but instead mount the carrier(s) for the laser range sensors 7, 8, 9, 10 directly on the frame of the rolling weight deflectometer 11, or even use the frame itself as the carrier.

What is claimed is:

1. An apparatus for rolling weight deflection measurement comprising:
    a rolling wheel configured to be moved along a measuring surface in a first direction,
    a frame extending essentially along said measuring surface in said first direction,
    at least one carrier,
    a number of spaced apart range sensors arranged on said at least one carrier and configured to measure a distance to said measuring surface at pavement locations passed by the apparatus, a first range sensor of the said range sensors being arranged at a fixed location with respect to said rolling wheel, and a remainder of the said range sensors being arranged in a spaced apart manner in line with said first range sensor in the first direction, and
    at least one inclination sensor configured to measure at least a change in inclination of said at least one carrier, wherein the said range sensors and the said at least one inclination sensor provide input to a data processor adapted to calculate a curvature of a depression basin formed by the apparatus in the measuring surface when the apparatus is moved along the measuring surface.

2. The apparatus according to claim 1, wherein said first of said range sensors is arranged at a location corresponding to said rolling wheel, and the remainder of the range sensors are arranged in a spaced apart manner preceding or succeeding said first range sensor in the first direction.

3. The apparatus according to claim 1, wherein said at least one inclination sensor comprises at least a pair of accelerometers.

4. The apparatus according to claim 1, wherein the number of the said range sensors is three.

5. A method for surveying a pavement using a rolling weight deflectometer, comprising:
    moving the rolling weight deflectometer along a measuring surface;
    obtaining, using a number of range sensors, a corresponding number of sequential distance measurements over time as the rolling weight deflectometer is moved along said measuring surface,
    obtaining, using an inclination sensor, a sequence of inclination measurements over time as the rolling weight deflectometer is moved along said measuring surface,
    comparing distance measurements from the number of sequential distance measurements for a plurality of locations passed by said rolling weight deflectometer, and
    calculating, based on said distance measurements and corresponding inclination measurements of the sequence of inclination measurements, a curvature parameter of a depression basin.

6. The method according to claim 5, wherein the curvature parameter is a value $\kappa$ calculated using the formula:

$$\kappa i = di - 2di+1 + di+2$$

wherein:
    di is a deflection measured with an i'th range sensor of the number of range sensors,
    di+1 is a deflection measured with an (i+1)'th range sensor of the number of range sensors,
    di+2 is a deflection measured with an (i+2)'th range sensor, and
    i is an indexing integer.

* * * * *